United States Patent Office 2,837,528
Patented June 3, 1958

2,837,528
PHTHALOCYANINE PIGMENTS

André Pugin, Basel, and Ernst Keller, Binningen, Switzerland, assignors to J. R. Geigy A.-G., Basel, Switzerland, a Swiss firm No Drawing. Application January 30, 1956
Serial No. 562,043

Claims priority, application Switzerland
February 1, 1955

4 Claims. (Cl. 260—299)

The present invention concerns new, yellow green to green phthalocyanine pigments which are distinguished from previously known compounds by their more pure shade and their greater economy in use. It also concerns processes for the production of the new phthalocyanine pigments as well as their use for the dyeing of organic material.

It is known that 2-naphthotriazolyl benzene-o-dicarboxylic acids or derivatives thereof modified at the carboxyl groups, which contain at least one sulphonic acid group at the naphthalene or benzene ring, can be converted by methods known per se into sulphonated naphthotriazolyl phthalocyanines. In the form of their alkali salts, these compounds have no affinity to the usual textile fibres and must be lacquered with earth alkali or earth metal salts and used as pigments. Pigments so obtained have dull yellow green shades; they are not economical in use and are not, therefore, of technical importance.

If the known process is applied to 2-naphtho-triazolyl-benzene-o-dicarboxylic acids or to derivatives thereof modified at the carboxyl groups but which contain no sulphonic acid groups, then the phthalocyanine formation does not occur.

It has now been found that yellow green to green phthalocyanine pigments can be produced which are distinguished from comparable known compounds by their much more pure shade and very much greater economy in use if unsulphonated o-aminoazo dyestuffs of the general Formula I

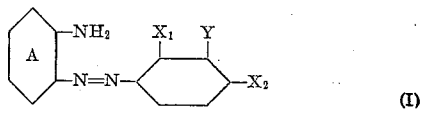

(I)

are heated in the presence of oxidising agents and the usual additives having a favourable effect on the pathalocyanine formation, possibly in the presence of ammonia and/or agents giving off heavy metal, at temperatures of over 120° to 220° and advantageously at temperatures of 150°–190°. In the above formula: $X_1$ or $X_2$ and Y each represent a possibly modified carboxyl group or a salt, in particular, the ammonium salt thereof, the other X represents hydrogen, wherein also both benzene rings can be further substituted as desired except by sulphonic acid groups and salts thereof, for example they can be substituted by halogen, alkyl, alkoxy groups, and wherein finally the benzene ring A can also form part of a more highly condensed, isocyclic or heterocyclic ring system.

Unsulphonated o-aminoazo dyestuffs which can be used according to the present invention are obtained for example from diazotised 3- or 4-amino phthalic acids which can be still further substituted, for example by halogen, and wherein one or both carboxyl groups can be modified, for example it or they can be in the form of carboxylic acid ester, carboxylic acid amide or nitrilo groups, by coupling with an azo component coupling in the o-position to an amino group. These latter can, for example, belong to the benzene, naphthalene, anthracene or also the heterocyclic series. Azo components which can be used are for example 1-amino-3-methoxy- or 3-ethoxy-4-methylbenzene, 1-amino-3-methoxy- or -ethoxy-4-chlorobenzene, 2-aminonaphthalene, 2-aminonaphthalene-1-sulphonic acid, 2-aminonaphthalene-6-sulphonic acid dimethyl-, -diethyl-, N-ethylphenyl-amide, 1-amino-5.8-dichloronaphthalene, 2-amino-6-methyl sulphonyl naphthalene, 2-aminoanthracene, 5-amino-benztriazole, 5-amino-2-phenyl benztriazole, 5-amino-2-naphthyl-(1′)-benztriazole, 5-amino-6-methyl-, -6-methoxy- or -6-chloro-2-phenyl benztriazole. The 2-aminonaphthalene compounds coupling in the 1-position are to be preferred; in particular 2-aminonaphthalene-1-sulphonic acid is a valuable starting material in the process according to the present invention.

Advantageous oxidising agents are those which are usual in the production of 1.2.3-triazole compounds from o-amino azo dyestuffs and which at the same time further the phthalocyanine formation. For example in the so-called urea process by which phthalocyanines are produced from aromatic o-dicarboxylic acids in the presence of urea as agent giving off ammonia and of ammonium molybdate as catalyst, an amount of a cupric salt can be added which is sufficient to oxidise the o-aminoazo dyestuff to form the 1.2.3-triazole compound, the cuprous salts resulting therefrom favouring the formation of phthalocyanine. In performing the so-called "urea-solvent process" which, as is known, consists in the use of a high boiling solvent in the urea process, it is even more advantageous to choose such high boiling solvents and diluents which are capable of oxidising the o-aminoazo dyestuff to form the 1.2.3-triazole compound at the reaction temperatures used. Nitrohydrocarbons such as nitrobenzenes, nitrotoluenes, nitroxylenes, nitronaphthalenes are suitable. Possibly, in the presence of high boiling solvents which have no oxidising action in the reaction conditions to form the phthalocyanine, such as, e. g. naphthalene, polyhalogen benzenes, the oxidation can be attained by introduction of oxygen or air.

Further additives which favour the phthalocyanine formation are, apart from ammonium molybdate already mentioned, iron and aluminum chloride, titanium, zirconium chlorides and oxy chlorides, arsenic oxides, ammonium vanadates and, often with particular advantage, also alkyl sulphonic acids, aromatic sulphonic and carboxylic acids and derivatives thereof such as halides or amides. Also sulphuric acid and its salts can replace organic acids or the salts thereof. For example, benzoic acid, α- and β-naphthalene sulphonic acid, tetralin sulphonic acid, p-toluene sulphonic acid, xylene sulphonic acid or the salts thereof can be added. Apart from the copper salts already mentioned, also cobalt, nickel, zinc or aluminum compounds can be used as agents giving off metal.

It has also been found that the triazole and the phthalocyanine formation must not necessarily take place in one step or in one and the same reaction medium. The phthalocyanine can be formed starting from previously prepared arylotriazolyl benzene-o-dicarboxylic acids or derivatives thereof provided that the reaction is performed under certain conditions. Compounds of the general formula II can be used as starting materials:

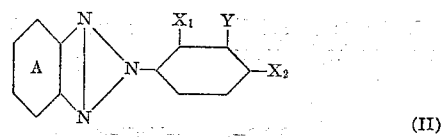

(II)

In this formula, $X_1$, $X_2$ and Y have the meanings given in Formula I and the possibilities regarding substitution and the benzene ring A still pertain. The phthalocyanine formation is bound up with the presence of a sufficient amount in the reaction agent of aliphatic sulphonic acids, aromatic carboxylic or sulphonic acids or the salts or derivatives thereof and/or of sulphuric acid or its salts, the presence of the other additives favouring the phthalocyanine formation being of advantage. In particular the naphthalene, tetraline and methyl benzene monosulphonic acids, their salts, the corresponding acid halides and amides mentioned in the preceding paragraph can be used, but also benzoic acid, even alkali bisulphates or sulphates can favour the phthalocyanine formation. According to the activity of the acids, acid derivatives or salts used, contents of 10 to 100% of the reaction mass are advisable, aliphatically or hydrocyclically substituted benzene monosulphonic acids being particularly effective. Still, also good results are obtained with naphthalene monosulphonic acids.

The yellow green to green phthalocyanines obtained according to the present invention correspond to the formula:

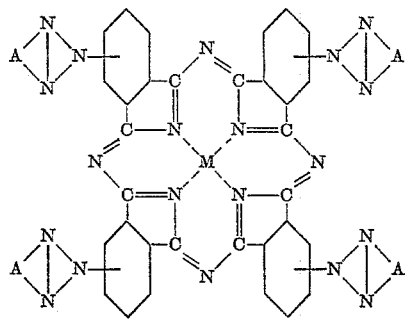

or, written more simply:

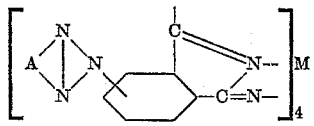

wherein A represents a phenylene, naphthalene or 1.2.3-triazolo-phenyl radical which is bound at two neighbouring C atoms to the N atoms of the 1.2.3-triazole ring, and wherein M represents a co-ordinated heavy metal atom, for example, Cu, Co, Ni or Zn. These metal complexes can generally be used as pigments after usual purification with diluted acids and lyes and with organic solvents; they can however, also be converted by the usual milling or precipitation methods into tinctorially strong pigments which are economical in use. They can be used in the usual way for the dyeing of lacquers, varnishes and synthetic materials of all types, for painting and printing colours as well as in pigment printing pastes for textiles. They may also be converted into water soluble compounds by sulphonation or into sulphamide compounds by sulphohalogenation and reaction with amines.

Further details regarding performance of the processes according to the present invention as well as the use of the pigment dyestuffs obtained thereby can be seen from the following examples. The examples however, only serve to illustrate the subject matter of the invention without limiting it in any way. Where not otherwise stated, parts are given as parts by weight and the temperatures are in degrees centigrade. Where parts by volume are expressly mentioned, their relationship to parts by weight is as that of millilitres to grammes.

*Example 1*

13.4 parts of 3.4-dicarboxybenzene-azo-2′-aminonaphthalene of the formula:

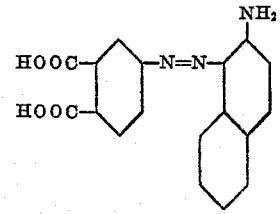

produced by coupling diazotised 4-aminophthalic acid with 2-aminonaphthalene, are heated at 180–185° while stirring with 14.4 parts of urea, 1.5 parts of anhydrous copper-II chloride and 0.2 part of ammonium molybdate in 100 parts of nitrobenzene. After about 4 hours, an intensively green, pure dyestuff is formed which is filtered off after 10 hours and is washed with hot nitrobenzene and acetone. After extraction with hot, diluted hydrochloric acid and caustic soda lye, a yellow green, pure pigment, tetra-(naphtho-triazolyl)-copper phthalocyanine, is obtained. It has excellent fastness to light.

*Example 2*

13.4 parts of 3.4-dicarboxybenzene-azo-2′-aminonaphthalene are heated at 180–185° while stirring with 14.4 parts of urea, 1.5 parts of anhydrous copper-II chloride, 0.2 part of ammonium molybdate and 10 parts of the sodium salt of β-naphthalene sulphonic acid in 120 parts of nitrobenzene for 14 hours. After cooling and then adding 30 parts of a 30% aqueous solution of sodium hydroxide, the green suspension is distilled with steam. When no more nitrobenzene can be traced in the distillate, the pigment is filtered off and washed with water. After extraction with boiling diluted hydrochloric acid and with hot alcohol, about 10 parts of a pure green dyestuff are obtained. It has excellent fastness to light and is very economical in use.

Equally good products are obtained if in this example the sodium salt of β-naphthalene sulphonic acid is replaced by the same number of parts of the sodium salts of β-tetraline sulphonic acid or xylene sulphonic acid.

Pigments of a somewhat more dull shade are obtained if in this example, the copper-II chloride is replaced by the same number of parts of anhydrous nickel, cobalt or zinc chloride.

*Example 3*

18.3 parts of 3.4-dicarboxybenzene-azo-2′-amino-4′-methoxy-5′-methylbenzene of the formula:

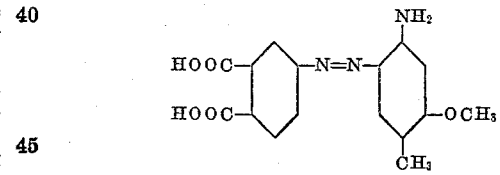

obtained by coupling diazotised 4-aminophthalic acid with 1-amino-3-methoxy-4-methylbenzene, are heated while stirring at 190–195° for 17 hours with 21.6 parts of urea, 2.2 parts of anhydrous copper-II chloride, 0.2 part of ammonium molybdate and 14 parts of benzoic acid in 150 parts of nitrobenzene. The pigment is isolated and purified as described in Example 2. 12 parts of a pure green, very fast to light pigment are obtained. Instead of benzoic acid, also the same number of parts of anhydrous sodium sulphate or of ethane sulphonic acid can be used in this example.

A very similar green pigment is obtained by using an o-aminoazo dyestuff of the above construction in which the methoxy group is replaced by the ethoxy group and the methyl group is replaced by chlorine.

*Example 4*

38.4 parts of 2.3-dicarboxybenzene-azo-2′-aminonaphthalene of the formula:

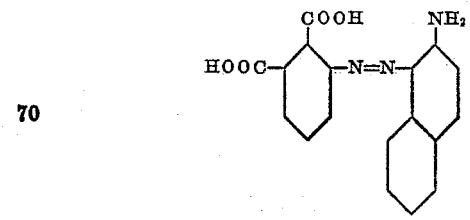

produced by coupling diazotised 3-aminophthalic acid with 2-aminonaphthalene-1-sulphonic acid are heated while stirring at 160–170° for 8 hours with 9 parts of anhydrous copper-II chloride in 300 parts of nitrobenzene. 43.2 parts of urea, 20 parts of the sodium salt of xylene sulphonic acid and 0.3 part of ammonium molybdate are added to the suspension which has become yellow. The whole is stirred for 10 hours at 170–175°. The pure green dyestuff is filtered off and washed with glycol monoethyl ether, then extracted with diluted caustic soda lye and hydrochloric acid and dried. The pigment has the same shade as the copper phthalycyanine derivative of Example 2.

Example 5

13 parts of 3.4-dicarboxybenzene-azo-5'-aminobenztriazole of the formula:

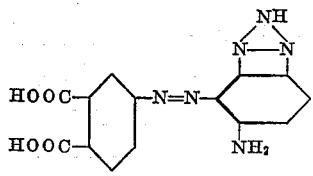

produced by coupling diazotised 4-amino phthalic acid with 5-amino benztriazole, are heated while stirring at 180–185° for 14 hours with 14.4 parts of urea, 1.5 parts of anhydrous copper-II chloride, 0.2 part of ammonium molybdate and 12 parts of the sodium salt of xylene sulphonic acid in 100 parts of nitrobenzene. The green pigment formed is isolated as described in Example 2. It has very good fastness to light.

Similar green pigments are obtained if in the above example 16.6 parts of the o-aminoazo dyestuff of the formula:

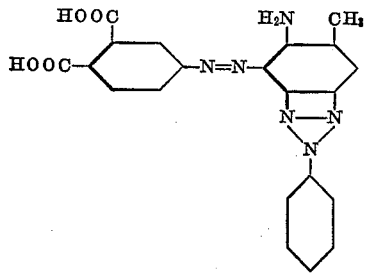

or 18.3 parts of the o-aminoazo dyestuff of the formula:

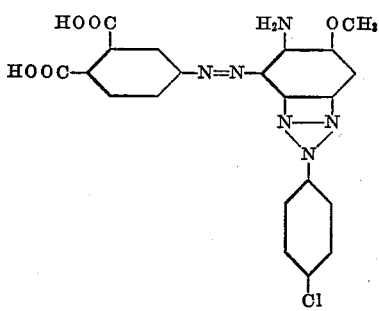

are used.

Example 6

26.6 parts of 4-[2'-(naphtho-1".2":4'.5')-1'.2'.3'-triazolyl]-benzene-1.2-dicarboxylic acid anhydride of the formula:

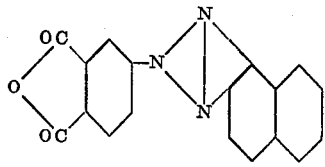

(M. P. 264–265°) produced by oxidation of 3.4-dicarboxybenzene-azo-2'-aminonaphthalene by means of copper-II salts or alkali hypochlorites in aqueous solution and recrystallisation from acetic acid anhydride, are heated while stirring at 180–185° for 16 hours with 28.8 parts of urea, 20 parts of the sodium salt of xylene sulphonic acid, 3 parts of anhydrous copper-II chloride and 0.4 part of ammonium molybdate in 200 parts of nitrobenzene. After cooling and adding 20 parts of 30% caustic soda lye, the nitrobenzene is distilled off with steam. After filtration, the pigment is extracted with diluted hydrochloric acid and then with alcohol. 20 parts of a pure green pigment are obtained. This is dissolved cold in 200 parts of 96% sulphuric acid and precipitated with 1000 parts of water at 50°. After filtering and washing with water, the damp pigment is again pasted in 200 parts of water with 2 parts of sodium carbonate and 0.5 part of triethanolamine salt of oleic acid at 80°, filtered off, washed and dried.

A similar green colour pigment is obtained if in the above example, 31 parts of 4-[2"-(5".8"-dichloronaphtho-1".2":4'.5') - 1'.2'.3' - triazolyl] - benzene - 1.2 - dicarboxylic acid anhydride is used. This compound can be produced by oxidising 2-(3'.4'-dicarboxy-benzene azo)-1-amino-5.8-dichloronaphthalene to form the 1.2.3-triazole and heating in acetic acid anhydride.

Also a green pigment is obtained in the same good yield if in this example the copper-II chloride is replaced by the same number of parts of anhydrous cobalt, nickel or zinc chloride.

Example 7

11 parts of 4-[5'-aminobenztriazolyl-(2')]-benzene-1.2-dicarboxylic acid of the formula:

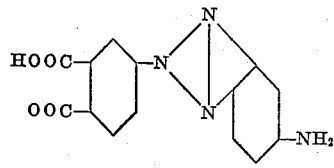

produced by oxidation, in aqueous solution with copper-II salts, of 3.4-dicarboxybenzene-azo-2'.4'-diaminobenzene, are heated while stirring at 170–180° for 14 hours with 14.4 parts of urea, 1.5 parts of anhydrous copper-II chloride, 0.2 parts of ammonium molybdate and 8 parts of the sodium salt of β-naphthalene sulphonic acid in 100 parts of nitrobenzene. A pure green dyestuff is formed which is isolated as described in Example 2.

Example 8

20 parts of the pigment produced according to Example 2, 20 parts of aluminium hydrate, 60 parts of boiled linseed oil of medium viscosity and 0.5 part of cobalt linoleate are mixed and ground in a three-roll mill. A lithographic lacquer is obtained which produces green prints of particular purity and tinctorial strength.

Example 9

10 parts of the pigment produced according to Example 6, 10 parts of titanium dioxide, 35 parts of a 60% solution of a modified urea-alkyd resin in xylene/butanol 1:1, 10 parts of spirit of turpentine and 5 parts of xylene are mixed for 48 hours in a ball mill. After pouring on to aluminium sheets and stoving for 1 hour at 120°, pure green dyeings are obtained which are fast to crosslacquering.

Example 10

67 parts of polyvinyl chloride, 33 parts of dioctyl phthalate, 2 parts of dibutyl tin dilaurate, 0.67 part of the pigment produced according to Example 3 and 2 parts of titanium dioxide are mixed together and then worked up for 10–15 minutes on 157–163° hot rollers into a foil. This green polyvinyl dyeing is distinguished by its tinctorial strength, its stability to heat and bleeding as well as by its very good fastness to light.

What we claim is:

1. A phthalocyanine pigment dye of the formula

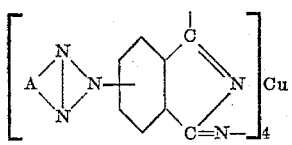

wherein A is a member selected from the group consisting of the 1.2-naphthylene and 5-methoxy-4-methyl-1.2-phenylene radicals.

2. A phthalocyanine pigment dye of the formula:

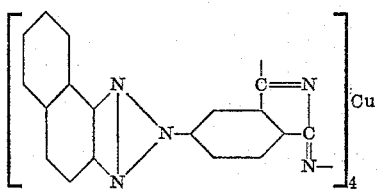

wherein Cu is a co-ordinated copper atom.

3. A phthalocyanine pigment dye of the formula:

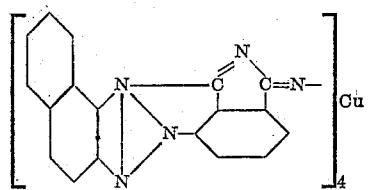

wherein Cu is a co-ordinated copper atom.

4. A phthalocyanine pigment dye of the formula:

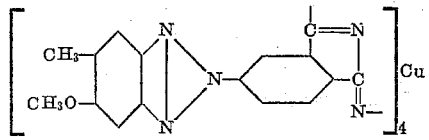

wherein Cu is a co-ordinated copper atom.

References Cited in the file of this patent

FOREIGN PATENTS 830,909    France _____ May 23, 1938